United States Patent
Wirola et al.

(10) Patent No.: US 10,742,497 B2
(45) Date of Patent: Aug. 11, 2020

(54) RECONFIGURATION OF A RADIO POSITIONING SUPPORT SYSTEM

(71) Applicant: HERE GLOBAL B.V., Eindhoven (NL)

(72) Inventors: Lauri Aarne Johannes Wirola, Tampere (FI); Henri Jaakko Julius Nurminen, Tampere (FI); Pavel Ivanov, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 16/185,783

(22) Filed: Nov. 9, 2018

(65) Prior Publication Data
US 2020/0153688 A1 May 14, 2020

(51) Int. Cl.
*H04L 12/24* (2006.01)
*H04W 64/00* (2009.01)
(Continued)

(52) U.S. Cl.
CPC .......... *H04L 41/0813* (2013.01); *G01S 5/021* (2013.01); *H04W 64/003* (2013.01); *G01S 5/04* (2013.01)

(58) Field of Classification Search
CPC .............. H04L 41/0813; H04W 64/00; H04W 64/003; G01S 5/021; G01S 5/0027; G01S 5/0036; G01S 5/0242
(Continued)

(56) References Cited

U.S. PATENT DOCUMENTS 8,098,590 B2 * 1/2012 Catovic ................. H04W 24/08
370/252
9,763,054 B2 9/2017 Kong et al.
(Continued)

FOREIGN PATENT DOCUMENTS

EP 2 565 664 A1 3/2013
WO WO 2012/052700 A1 4/2012
(Continued)

OTHER PUBLICATIONS

Bhagat, T. et al., *Improving Network Lifetime With Connectivity and Coverate in WSN*, International Journal on Future Revolution in Computer Science & Communication Engineering, vol. 2, Issue 8 (Aug. 2016) 7 pages.
(Continued)

*Primary Examiner* — Candal Elpenord
(74) *Attorney, Agent, or Firm* — Alston & Bird LLP

(57) ABSTRACT

A method and apparatus least partially reconfigure a radio positioning support system. The radio positioning support system determines a position of a mobile device at least partially based on a radio positioning support signal transmitted by the mobile device. The method includes obtaining a plurality of reference observation reports. Each reference observation report is associated with a respective radio positioning support device and wherein each reference observation report represents scanning results from scanning, by the respective radio positioning support device with which the respective reference observation report is associated, for radio reference signals transmitted by other radio positioning support devices. The method also includes determining, based on the reference observation reports, whether a predetermined radio positioning support criterion is met by the radio positioning support system and, if not, determining (Continued)

reconfiguration information for at least partially reconfiguring the radio positioning support system.

19 Claims, 5 Drawing Sheets

(51) Int. Cl.
*G01S 5/02* (2010.01)
*G01S 5/04* (2006.01)

(58) Field of Classification Search
USPC .................................................. 370/252, 254
See application file for complete search history.

(56) References Cited

U.S. PATENT DOCUMENTS

| | | | | |
|---|---|---|---|---|
| 2003/0119496 | A1* | 6/2003 | Gaal | G01S 1/024 455/424 |
| 2012/0083278 | A1* | 4/2012 | Kazmi | H04W 36/06 455/440 |
| 2014/0087754 | A1* | 3/2014 | Siomina | G01S 5/0205 455/456.1 |
| 2015/0094091 | A1* | 4/2015 | Stern-Berkowitz | G01S 5/0205 455/456.1 |
| 2015/0350850 | A1* | 12/2015 | Edge | H04W 88/02 455/456.1 |
| 2016/0084646 | A1* | 3/2016 | Chen | G01S 5/021 702/150 |
| 2016/0161592 | A1 | 6/2016 | Wirola et al. | |
| 2017/0034027 | A1* | 2/2017 | Thompson | H04W 64/00 |
| 2018/0136308 | A1 | 5/2018 | Wirola et al. | |

FOREIGN PATENT DOCUMENTS

| | | |
|---|---|---|
| WO | WO 2015/118135 A1 | 8/2015 |
| WO | WO 2016/180480 A1 | 11/2016 |
| WO | WO 2017/000978 A1 | 1/2017 |
| WO | WO 2019/034237 A1 | 2/2019 |
| WO | WO 2019/034237 A9 | 2/2019 |
| WO | WO 2019/034239 A1 | 2/2019 |
| WO | WO 20191034240 A1 | 2/2019 |

OTHER PUBLICATIONS

Atia, M. M. et al., *Dynamic Online-Calibrated Radio Maps for Indoor Positioning in Wireless Local Area Networks*, IEEE Transactions on Mobile Computing, vol. 12, No. 9 (Sep. 2012) 1774-1787.

Extended European Search Report for Application No. 192064368 dated Apr. 15, 2020, 10 pages.

* cited by examiner

RECONFIGURATION OF A RADIO POSITIONING SUPPORT SYSTEM

FIELD OF THE DISCLOSURE

The invention relates to the field of radio positioning support systems and more specifically to reconfiguring a radio positioning support system or reconfiguration of a radio positioning support system.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth low energy (BLE) based positioning solutions, cellular network based positioning solutions and wireless local area network (WLAN) based positioning solutions.

In a network-centric positioning solution, a plurality of hubs may for example be deployed in the environment for which a positioning solution is to be provided. The hubs may scan for radio signals (e.g. Bluetooth signals) transmitted by mobile devices (e.g. tag devices) and may provide observation reports representing scanning results to a positioning server. When at least three hubs (preferably more than three hubs) observe radio signals from a certain mobile device, the positioning server may determine an estimated position of the mobile device by triangulation, multilateration or trilateration.

SUMMARY OF SOME EMBODIMENTS OF THE INVENTION

According to an exemplary aspect of the invention, a method for at least partially reconfiguring a radio positioning support system is disclosed, wherein the radio positioning support system is configured for determining a position of a mobile device at least partially based on a radio positioning support signal transmitted by the mobile device, the method comprising:
  obtaining a plurality of reference observation reports, wherein each reference observation report of the plurality of reference observation reports is associated with a respective radio positioning support device of a plurality of radio positioning support devices, and wherein each reference observation report of the plurality of reference observation reports represents scanning results from scanning, by the respective radio positioning support device with which the respective reference observation report is associated, for radio reference signals transmitted by other radio positioning support devices of the plurality of radio positioning support devices;
  determining, based on the plurality of reference observation reports, whether a predetermined radio positioning support criterion is met by the radio positioning support system; and
  if it is determined that the predetermined radio positioning support criterion is not met by the radio positioning support system, determining reconfiguration information for at least partially reconfiguring the radio positioning support system.

The radio positioning support system may comprise the plurality of radio positioning support devices and/or one or more positioning servers. For example, the radio positioning support system may be any one embodiment of the below disclosed system.

It is to be understood that the disclosed method may be performed by the radio positioning support system, for example by one or more apparatuses (e.g. one or more radio positioning support devices and/or one or more positioning servers) of the radio positioning support system. For example, one apparatus of the radio positioning support system may perform all steps of the disclosed method or at least two apparatuses of the radio positioning support system may cooperate to perform all steps of the disclosed method (e.g. some steps may be performed by one apparatus and other steps may be performed by one or more other apparatuses). The apparatus(es) may be any one embodiment of the below disclosed apparatus(es).

As disclosed above, the radio positioning support system is configured for determining a position of a mobile device at least partially based on a radio positioning support signal transmitted by the mobile device. This may be understood to mean that the radio positioning support system is or is part of a network-centric positioning solution. The radio positioning support signal may contain or represent positioning support information. The positioning support information is for example configured to enable the radio positioning support system to determine an estimated position of the mobile device. An example of such positioning support information is an identifier of the mobile device transmitting the radio positioning support signal. For example, one or more (e.g. all) radio positioning support devices of the plurality of radio positioning support devices may scan or may be configured to scan for radio positioning support signals transmitted by mobile devices; and one or more (e.g. all) radio positioning support devices of the plurality of radio positioning support devices may generate or may be configured to generate a respective positioning observation report representing scanning results (e.g. radio positioning support information extracted from the radio positioning support signal and/or measurement results) from scanning for radio positioning support signals. The scanning may be performed automatically and/or repeatedly (e.g. periodically and/or continuously and/or for a predetermined period of time). The positioning observation reports may then be used for determining an estimated position for each mobile device from which one or more respective radio positioning support signals have been observed by at least three (e.g. preferably more than three) radio positioning support devices of the plurality of radio positioning support devices when scanning for radio positioning support signals. For example, such an estimated position may be determined by triangulation, mulitlateration or trilateration. Since the estimated positioning is determined by the positioning server, such a network-centric positioning solution is particularly suited for mobile devices having limited computing resources like tag devices. It is however to be understood that the present invention is not limited to such tag devices. The mobile device may for example be one of a tag device, a smartphone, a tablet computer, a notebook computer, a smart watches and a smart bands.

For example, each reference observation report of the plurality of reference observation reports may be obtained in a similar fashion than the positioning observation reports. In contrast to the positioning observation reports, each reference observation report of the plurality of reference observation reports however represents scanning results from scanning for radio reference signals transmitted by other radio positioning support devices of the plurality of radio positioning support devices (and not radio positioning support signals transmitted by one or more mobile devices). To this end, one or more (e.g. all) radio positioning support devices of the plurality of radio positioning support devices may transmit or may be configured to transmit a respective radio reference signal. Moreover, one or more (e.g. all) radio positioning support devices of the plurality of radio positioning support devices may scan or may be configured to scan for radio reference signals transmitted by other radio positioning support devices of the plurality of radio positioning support devices; and one or more (e.g. all) radio positioning support devices of the plurality of radio positioning support devices may generate or may be configured to generate a respective reference observation report representing scanning results from scanning for radio reference signals. The scanning and/or transmitting may be performed automatically and/or repeatedly (e.g. periodically and/or continuously and/or for a predetermined period of time).

It is to be understood that it is not necessary that all radio positioning support devices of the plurality of radio positioning support devices scan and/or are configured to scan for radio reference signals and/or transmit and/or are configured to transmit radio reference signals. This is for example advantageous for updating existing radio positioning support systems which comprise radio positioning support devices which are not able to scan for radio reference signals and/or to transmit radio reference signals.

The observation report(s) (e.g. positioning observation reports and/or reference observation reports) may be generated (e.g. always) after scanning for radio signals (e.g. after every scanning cycle). Alternatively, the observation report(s) may (only) be generated if a particular result is obtained from the scanning for radio reference signals. The particular result may be selected such that it is at least likely that the predetermined radio positioning support criterion is not met. This allows a decentralized and simple solution for reconfiguring the radio positioning support system, because the reference observation reports may only be generated (and subsequently transmitted) if it is at least likely that the predetermined radio positioning support criterion is not met.

An observation report (e.g. a positioning observation report or a reference observation report) associated with a certain radio positioning support device may be understood to represent scanning results for one or more (e.g. all) radio signals (e.g. radio positioning support signals or radio reference signals) observed by the certain radio positioning support device when scanning for such radio signals (e.g. observed during one scanning cycle). Accordingly, a certain observation report may be understood to be associated with a certain radio positioning support device, if the observation report was generated by the certain radio positioning support device and/or if the observation report represents scanning results obtained by the certain radio positioning support device when scanning for radio signals.

Such scanning results may be understood to be or to indicate information (e.g. positioning support information and/or an identifier) extracted from the one or more observed radio signals and/or measurement results from measuring one or more parameters (e.g. an angle of arrival and/or a received signal strength) of the one or more observed radio signals and/or an indication of a number of observed radio signals. For example, one or more (e.g. all) radio positioning support devices of the plurality of radio positioning support devices may be configured to extract information from one or more observed radio signals and/or to measure one or more parameters of observed radio signals and/or to count the number of observed radio signals when scanning for radio signals (e.g. observed during one scanning cycle).

A radio signal (e.g. a radio positioning support signal or a radio reference signal) may be understood to be observable by a certain radio positioning support device if it is received with a minimum quality (e.g. a minimum signal-to-noise ratio and/or a minimum signal power) by the certain radio positioning support device when scanning for radio signals (e.g. radio positioning support signals or radio reference signals).

One or more (e.g. all) of the radio positioning support devices of the plurality of radio positioning support devices may transmit (e.g. broadcast) or may be configured to transmit (e.g. broadcast) one or more respective observation reports (e.g. positioning observation reports or a reference observation reports). The observation reports may be transmitted to an apparatus at least partially performing the disclosed method, for example a radio positioning support device or a positioning server. It is to be understood that the observation reports may be transmitted directly (e.g. via a direct communication path like a network connection) or indirectly (e.g. via an indirect communication path comprising at least two subsequent hops and/or network connections) to the apparatus at least partially performing the disclosed method. For example, one or more (e.g. all) radio positioning support devices of the plurality of radio positioning support may retransmit or may be configured to retransmit (e.g. forward) observation reports which they receive from other radio positioning support devices of the plurality of radio positioning. For example, the radio positioning support devices of the plurality of radio positioning may form a mesh network for distributing the observation reports.

Obtaining the plurality of reference observation reports may be understood to mean that one or more (e.g. all) reference observation reports of the plurality of reference observation reports are received from one or more (e.g. all) radio positioning support devices of the plurality of radio positioning support devices. Alternatively or additionally, the plurality of reference observation reports may be obtained by generating one or more (e.g. all) reference observation reports of the plurality of reference observation reports. It is to be understood that the plurality of reference observation reports may be partially generated and partially received.

The predetermined radio positioning support criterion may be selected such that the radio positioning support system enables determining an estimated position of a mobile device based on a radio positioning support signal transmitted by the mobile device with a predetermined minimum accuracy within a coverage area of the radio positioning support system if the predetermined radio positioning support criterion is met. Therein, the coverage area of the radio positioning support system may be understood to represent an area within which the radio positioning support system is expected to determine and/or should be able to determine an estimated position of a mobile device.

For example, at least partially reconfiguring the radio positioning support system may involve reconfiguring one or more radio positioning support devices of the plurality of radio positioning support devices, for example by adapting their installation positions and/or by adapting their reception parameters (e.g. directional reception parameters). Alternatively or additionally, at least partially reconfiguring the radio positioning support system may involve installing one or more further radio positioning support devices in the coverage area of the radio positioning support system.

Accordingly, reconfiguration information for at least partially reconfiguring the radio positioning system may represent at least one of (1) adapted installation positions or areas for one or more radio positioning support devices of the plurality of radio positioning support devices, (2) adapted reception parameters for one or more radio positioning support devices of the plurality of radio positioning support devices and (3) one or more further installation positions or areas for installing one or more further radio positioning support devices.

In certain exemplary embodiments of the invention, the disclosed method may be used during the installation stage of the radio positioning support system to ensure that the radio positioning support system meets the predetermined radio positioning support criterion. Alternatively or additionally, it may be used after the installation stage to adapt the configuration of the radio positioning support system to changes in a radio environment of the radio positioning support system which may for example be due to a change of a position of one or more radio positioning support devices, or a failure of one or more radio positioning support devices, or a (e.g. temporary) presence of interference, or a combination thereof. In a first step, the reference observation reports may be obtained and, in a subsequent second step, it may be determined, based on the obtained reference observation reports, whether a predetermined radio positioning support criterion is (e.g. expected to be) met by the radio positioning support system. If the predetermined radio positioning support criterion is not met, this may indicate that the radio positioning support system should be reconfigured (e.g. due to a change in the radio environment of the radio positioning support system). Accordingly, reconfiguration information for reconfiguring the radio positioning support system may be determined in a third step, if it is determined that the predetermined radio positioning support criterion is not met by the radio positioning support system. The reconfiguration information may be determined to enable reconfiguration of the radio positioning support system such that the radio positioning support system meets the predetermined radio positioning support criterion or, if not possible, comes as close as possible to the predetermined radio positioning support criterion. For example, one or more iterations of these steps may be necessary before the radio positioning support criterion is met.

This is for example advantageous to allow reconfiguring the radio positioning support system such that it meets the predetermined radio positioning support criterion or, if not possible, to come as close as possible to the predetermined radio positioning support criterion.

According to a further exemplary aspect of the invention, an apparatus is disclosed, wherein the apparatus comprises means for performing one or more (e.g. all) steps of any one embodiment of the disclosed method.

The means of the disclosed apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit. The disclosed apparatus may comprise a single means for all functions, a common plurality of means for all functions, or a plurality of different means for different functions.

According to a further exemplary aspect of the invention, an apparatus is disclosed, wherein the apparatus comprises at least one processor and at least one memory including computer program code, the at least one memory and the computer program code with the at least one processor configured to cause the apparatus at least to perform any one embodiment of the disclosed method (e.g. the steps of any one embodiment of the disclosed method).

For example, the disclosed apparatus(es) may be modules or components for a device, for example chips. Alternatively, the disclosed apparatus(es) may be devices. In particular, the disclosed apparatus(es) may be a radio positioning support device or a server (e.g. a positioning server) for the radio positioning support system.

It is to be understood that the disclosed apparatus(es) may comprise only the disclosed components (e.g. means) or may further comprise one or more additional components (e.g. means). Examples of such additional components are a communication interface, a network interface, a radio interface (e.g. a receiver, a transmitter and/or a transceiver), a data interface, a user interface (e.g. a touch-sensitive display, a keyboard, a touchpad, a display, etc.) etc.

According to a further exemplary aspect of the invention, a radio positioning support system is disclosed which comprises a plurality of radio positioning support devices and an apparatus according to any one embodiment of the disclosed apparatus(es).

According to a further exemplary aspect of the invention, a non-transitory computer readable storage medium is disclosed, in which computer program code is stored. The computer program code causes an apparatus to perform any one embodiment of the disclosed method (e.g. the steps of any one embodiment of the disclosed method) when executed by a processor. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

According to a further exemplary aspect of the invention, a computer program code is disclosed, the computer program code when executed by a processor causing an apparatus to at least partially perform any one embodiment of the disclosed method (e.g. one or more (e.g. all) steps of any one embodiment of the disclosed method).

The disclosed method, apparatus(es), system, non-transitory computer readable storage medium and computer program code may be for at least partially reconfiguring the radio positioning support system.

In the following, further features and embodiments of these exemplary aspects of the invention will be described.

According to an exemplary embodiment of the invention, each radio reference signal of the radio reference signals emulates a respective radio positioning support signal.

For example, a radio reference signal may be understood to emulate a radio positioning support signal if both are transmitted with at least one (preferably more than one) identical radio signal parameters.

In certain exemplary embodiments of the invention, one or more radio signal parameters for transmitting a radio positioning support signal may be predetermined. In such exemplary embodiments, a certain radio reference signal may be understood to emulate a radio positioning support signal if the certain radio reference signal is transmitted with the one or more predetermined radio signal parameters for transmitting a radio positioning support signal.

Examples of such radio signal parameters are a radio signal type (e.g. a Bluetooth-, BLE- or WLAN radio signal as disclosed below), a radio signal format (e.g. an advertisement signal format, an Eddystone signal format or a beacon frame format), a radio signal channel or a radio signal frequency range, and a radio signal transmission power.

According to an exemplary embodiment of the invention, the radio reference signals and the radio positioning support signal are one of a Bluetooth radio signal and a Bluetooth low energy (BLE) radio signal. Accordingly, one or more (e.g. all) radio positioning support devices of the plurality of radio positioning support devices may be one of:
 a Bluetooth device;
 a Bluetooth device enabling Bluetooth low energy (BLE) mode; and
 a Bluetooth low energy (BLE) device.

A Bluetooth device that is employed for the invention may be any kind of Bluetooth device complying with any present or future standard. The Bluetooth standards are specified by the Bluetooth Special Interest Group and are presently available under https://www.bluetooth.com/.

The Bluetooth device may comprise a Bluetooth and/or BLE radio interface, which includes at least a Bluetooth and/or BLE transmitter and a Bluetooth and/or BLE receiver. The transmitter and receiver may also be a part of a Bluetooth and/or BLE transceiver. The Bluetooth and/or BLE radio interface may be configured to transmit Bluetooth and/or BLE radio signals. Accordingly, the radio reference signal transmitted by such a device may be a Bluetooth and/or BLE radio reference signal. Additionally, the Bluetooth and/or BLE radio interface may be configured to receive Bluetooth and/or BLE radio signals (e.g. Bluetooth and/or BLE radio positioning support signals and/or Bluetooth and/or BLE radio reference signals) that are for example broadcast by other Bluetooth and/or BLE devices and/or by mobile devices.

Such Bluetooth devices can be easily installed at various installation positions and require little to no maintenance. For example, a plurality of Bluetooth devices may be easily distributed across a certain area and may cover a certain area (e.g. the coverage area of the radio positioning support system) for receiving radio positioning support signals transmitted (e.g. broadcasted) by mobile devices. Also, Bluetooth technologies are supported by many mobile devices by default such as most tag devices, most smartphones, most tablet computers, most notebook computers, most smart watches and most smart bands, etc. Using Bluetooth devices and/or BLE devices may thus have the effect that the many mobile devices may use the radio positioning support system without any adaptation of hardware. As a result, the approach may be globally scalable and have low maintenance and deployment costs. In addition, regarding positioning utilizing received signal strength (RSS) the end-user experience may be acceptable with these technologies, since a horizontal positioning accuracy of 2 to 3 meters as well as a high reliability in floor detection may be achieved. The beacons may be stand-alone devices or be integrated into or attached to some other device. For instance, a radio positioning support device may be a Bluetooth hub or a part thereof comprising such a Bluetooth device. Bluetooth devices, in particular in low energy mode, require comparably little energy and the use of Bluetooth low energy may enable a positioning with limited energy consumption at all involved devices.

As mentioned above, many mobile devices already comprise Bluetooth transmitters and/or BLE transmitters. Thus, each of the above embodiments may have the effect that positioning solutions based on such Bluetooth devices can be employed without any further hardware updates on the mobile device side. As an example, the mobile device may comprise a Bluetooth and/or BLE radio interface which includes at least a Bluetooth and/or BLE transmitter. The Bluetooth and/or BLE transmitter may also be a part of a Bluetooth and/or BLE transceiver. The Bluetooth and/or BLE radio interface may be configured to transmit (e.g. broadcast) Bluetooth and/or BLE radio positioning support signals.

As disclosed above, one or more radio signal parameters for transmitting a radio positioning support signal may be predetermined. In this exemplary embodiment of the invention, it may for example be predetermined that the radio positioning support signals are a Bluetooth and/or BLE radio positioning support signal. Moreover, it may be predetermined that the radio positioning support signals have an advertising signal format or an Eddystone signal format. A radio positioning support signal having an advertising signal format may be understood to contain or represent an advertisement frame with advertising data as specified in the Bluetooth standard; and a radio positioning support signal having an Eddystone signal format may be understood to contain or represent an Eddystone frame as specified in the Eddystone specification. The Eddystone specification is presently available under https://github.com/google/eddystone. Additionally, it may be predetermined that the radio positioning support signals are transmitted with a predetermined physical radio transmission power level value (e.g. a Tx power level value), for example the predetermined physical radio transmission power level value may be 0 dBm, 10 dBm or 20 dBm. The radio reference signals may accordingly be transmitted with the same radio signals parameters.

It is to be understood, however, that other types of radio positioning support devices than variations of Bluetooth devices may be used as well, for instance tags or other devices that are configured to receive ultra-wideband (UWB) signals or any wireless radio signals that might emerge in the future. For example, one or more radio positioning support devices of the plurality of radio positioning support devices may be an access point and/or a router of a wireless local area network (WLAN). Such an access point and/or router of a WLAN may comprise a WLAN radio interface, which for example includes a WLAN transceiver. The WLAN radio interface may be configured to transmit and/or receive (e.g. detect) WLAN radio signals. Accordingly, the radio positioning support signal transmitted by the mobile device may be a WLAN radio signal (e.g. a WLAN signal containing or representing a beacon frame as specified by the WLAN standards and transmitted with a predetermined physical transmission power level value (e.g. a Tx power value; e.g. 0 dBm, 10 dBm or 20 dBm)). WLAN is for example specified by the standards of the IEEE 802.11 family (http://www.ieee.org/).

According to an exemplary embodiment of the invention, one or more (e.g. all) radio positioning support devices of the plurality of radio positioning support devices are configured for at least one of (1) transmitting a respective radio reference signal and (2) scanning for radio reference signals transmitted by other radio positioning support devices of the plurality of radio positioning support devices.

According to an exemplary embodiment of the invention, each reference observation report of the plurality of reference observation reports contains or represents at least one of:
- a respective radio reference signal identifier for each radio reference signal observed by the respective radio positioning support device with which the respective reference observation report is associated when scanning for observable radio reference signals;
- one or more respective radio measurements results for each radio reference signal observed by the respective radio positioning support device with which the respective reference observation report is associated when scanning for observable radio reference signals;
- an indication for a number of radio reference signals observed by the respective radio positioning support device with which the respective reference observation report is associated when scanning for observable radio reference signals;
- an identifier of the respective radio positioning support device with which the observation report is associated;
- an indication of the installation position of the radio positioning support device with which the observation report is associated.

For example, each radio reference signal of the radio reference signals contains or represents a respective radio reference signal identifier. Such a radio reference signal identifier may be an identifier of the radio positioning support device that has transmitted the radio reference signal containing or representing the radio reference signal identifier. As disclosed above, one or more (e.g. all) radio positioning support devices of the plurality of radio positioning support devices may extract or may be configured to extract a respective radio reference signal identifier from each radio reference signal observed when scanning for radio signals.

An example for an identifier of a radio positioning support device is a name of the radio positioning support device, an address of the radio positioning support device (e.g. a MAC address or an IP address), an universally unique identifier (UUID), a service set identifier (SSID), a basic service set identifier (BSSID), an Eddystone identifier (e.g. an Eddystone-UID having a namespace component and an instance identifier component) or a combination thereof. For example, an identifier of a radio positioning support device of the plurality of radio positioning support devices may be unique or at least unique for the radio positioning support system.

Radio measurement results may be understood to (e.g. quantitatively or qualitatively) represent one or more radio parameters of an observed radio reference signal measured by the respective radio positioning support device with which the respective reference observation report is associated when scanning for observable radio reference signals. An example of such a radio parameter is a measured angle of arrival (AoA) of an observed radio reference signal which may be represented by an AoA value in degree. Another example of such a radio parameter is a measured received signal strength which may be represented by a received signal strength indicator (RSSI) or a physical receiving power level value (e.g. a Rx power level value) in dBm. For example, one or more (e.g. all) radio positioning support devices of the plurality of radio positioning support devices may measure or may be configured to measure an AoA and/or a received signal strength of each radio reference signal observed when scanning for radio signals.

An example of an indication of a number of observed radio reference signals contained in or represented by an observation report may be a quantitative indication, for example representing a number of observed different radio reference signals (e.g. a number counted when scanning for observable radio reference signals). Alternatively, an indication for a number of radio reference signals contained in or represented by an observation report may be a qualitative indication, for example indicating whether a number of observed different reference signals is less than and/or equal to and/or greater than a predetermined number of different radio reference signals.

An indication of the installation position of a radio positioning support device may represent the installation position of the radio positioning support device, for example in the form of absolute or relative position coordinates.

According to an exemplary embodiment of the invention, the method comprises at least one of:
- determining, at least partially based on the plurality of reference observation reports, whether by any radio positioning support devices of the plurality of radio positioning support devices at least a predetermined number of different radio reference signals is observable;
- determining, at least partially based on the reference observation reports, whether by one or more radio positioning support devices of the plurality of radio positioning support devices less than the predetermined number of different radio reference signals is observable;
- determining, at least partially based on the reference observation reports, whether at any monitoring position of a plurality of monitoring positions within a coverage area of the radio positioning support system at least the predetermined number of different radio reference signals is observable; and
- determining, at least partially based on the reference observation reports, whether at one or more monitoring positions of the plurality of monitoring positions within the coverage area of the radio positioning support system less than the predetermined number of different radio reference signals is observable.

As disclosed above, the coverage area of the radio positioning support system may be understood to represent an area within which the radio positioning support system is expected to determine and/or should be able to determine an estimated position of a mobile device.

The different radio reference signals may be understood to relate to radio reference signals transmitted by different radio positioning support devices of the plurality of radio positioning support devices. In other words, each of the different radio reference signals may be transmitted by another radio positioning support device of the plurality of radio positioning support devices.

The predetermined radio positioning support criterion may be considered to be met at a certain position if a radio positioning support signal transmitted by a mobile device from this certain position is observed by a minimum number of radio positioning support devices which need to observe the radio positioning support signal to be able to determine an estimated position of the certain mobile device with a predetermined minimum. Accordingly, the predetermined number of different radio reference signals may be selected to correspond to this minimum number of radio positioning support devices decremented by one. Therein, the predetermined number of different radio reference signals and the minimum number of radio positioning support devices is not equal, because it is expected that the radio positioning support device which observes the different radio reference signals observes a radio positioning support signal transmitted by the certain mobile device as well.

For example, the predetermined number of different radio reference signals may be set to two, three, four, five, or ten to name a few examples. It is to be understood that the predetermined number of different radio reference signals depends on the predetermined (e.g. desired) minimum accuracy of the radio positioning support system.

That the determining is at least partially based on the received plurality of observation reports may be understood to mean that one or more reference observation reports of the plurality of reference observation reports are considered for the determining. For example, for each radio positioning support device of the plurality of radio positioning support devices, the determining may be only based on the latest respective observation report and/or any respective observation report(s) that were obtained within a predetermined period of time (e.g. the last hour, the last six hours, the last 12 hours or the last 24 hours).

The determining whether by any radio positioning support devices of the plurality of radio positioning support devices at least a predetermined number of different radio reference signals is observable and/or the determining whether by one or more radio positioning support devices of the plurality of radio positioning support devices less than the predetermined number of different radio reference signals is observable may be performed by determining, for each radio positioning support devices of the plurality of radio positioning support devices, whether the respective reference observation report(s) of the plurality of reference observation reports indicate that at least the predetermined number or less than the predetermined number of different radio reference signals was observed by the respective radio positioning support when scanning for observable radio reference signals.

It may be expected based on the reciprocity of radio signal propagation (i.e. Lorentz reciprocity theorem or time-reversal symmetry) that, if any radio positioning support devices of the plurality of radio positioning support devices observes at least a predetermined number of different radio reference signals emulating a respective radio positioning support signal, a radio positioning support signal transmitted by a mobile device located at an installation position of a radio positioning support device of the plurality of radio positioning support devices is observed at least by a number of radio positioning support devices corresponding to the predetermined number of different radio reference signals incremented by one (i.e. the minimum number of radio positioning support devices). As disclosed above, the predetermined number of different radio reference signals is incremented by one, because it is expected that the radio positioning support device installed at the installation position observes the radio positioning support signal as well. Based on the scanning results represented by the plurality of observation reports, it may thus be determined whether or not the above disclosed exemplary predetermined radio positioning support criterion (i.e. a radio positioning support signal transmitted by a mobile device is observed at least by the minimum number of radio positioning support devices) is (e.g. expected to be) met at any installation position of the plurality of radio positioning support devices.

Moreover, if the radio positioning support devices of the plurality of radio positioning support devices are uniformly installed across the coverage area, it may be expected that, if the radio positioning support criterion is (e.g. expected to be) met at the installation positions of the plurality of radio positioning support devices, it is met throughout the coverage area of the radio positioning support system. Accordingly, it may be determined that the radio positioning support criterion is met if it is determined that by any radio positioning support devices of the plurality of radio positioning support devices at least the predetermined number of different radio reference signals is observable. Alternatively or additionally, it may be determined that the radio positioning support criterion is not met if it is determined that by one or more radio positioning support devices of the plurality of radio positioning support devices less than the predetermined number of different radio reference signals is observable.

This is a simple solution for determining whether or not the predetermined radio positioning support criterion is met, because it only requires a (simple) evaluation of the respective number of radio reference signals observed by each radio positioning support device of the plurality of radio positioning support devices. It is particularly suited for apparatus(es) having limited computing resources and/or for observation reports containing or representing an indication for a number of observed radio reference signals. Regarding other positions than the installations positions of the plurality of radio positioning support devices, it is however mainly based on the above expectation and, thus, suffers from a rather high uncertainty.

Alternatively or additionally, it may be determined whether at any monitoring position of a plurality of monitoring positions within a coverage area of the radio positioning support system at least the predetermined number of different radio reference signals is (e.g. expected to be) observable and/or whether at one or more monitoring positions of the plurality of monitoring positions within the coverage area of the radio positioning support system less than the predetermined number of different radio reference signals is (e.g. expected to be) observable.

The plurality of monitoring positions may be selected such that it is expected that the radio positioning support criterion is met at any position within the coverage area of the radio positioning support system if it is met at any monitoring position of the plurality of monitoring positions. Accordingly, it may be determined that the radio positioning support criterion is met if it is determined that at any monitoring position of the plurality of monitoring positions at least the predetermined number of different radio reference signals is observable; and/or it may be determined that the radio positioning support criterion is not met if it is determined that at one or more monitoring positions of the plurality of monitoring positions less than the predetermined number of different radio reference signals is observable.

The monitoring positions of the plurality of monitoring positions may at least partially correspond to grid points of a grid overlaying the coverage area of the radio positioning support system. The grid may be a regular grid. For example, the grid may be a square grid having a predetermined edge length, for example the predetermined edge length may be 1 m, 2 m, 5 m or 10 m to name a few non limiting examples.

For example, the plurality of monitoring positions may be at least partially different from the installation positions of the plurality of radio positioning support devices. For example, the plurality of monitoring positions may comprise additional monitoring positions in addition to the installation positions of the plurality of radio positioning support devices. By not only considering the installation position, but also additional monitoring positions the above disclosed uncertainty may be at least mitigated or removed.

Accordingly, it may be necessary to interpolate the scanning results represented by the reference observation reports to the additional monitoring positions. To this end, a respective radio model for the coverage area of the radio positioning support system may be determined at least partially based on the plurality of observation reports as disclosed below in more detail. A radio model of the coverage area of the radio positioning support system may be understood to be a representation of the (e.g. expected) propagation characteristics of radio signals (e.g. radio reference signals transmitted by the plurality of radio positioning support devices or radio positioning support signals transmitted by mobile devices) within the coverage area of the radio positioning support system.

An example of a radio model of the coverage area of the radio positioning support system may be a radio map representing a radio coverage model of each radio positioning support device of the plurality of radio positioning support devices. The radio coverage model of a certain radio positioning support device may describe (e.g. define) the area within which a radio reference signal transmitted by the certain radio positioning support devices is (e.g. expected to be) observable (e.g. receivable with a minimum quality). It may be expected based on the reciprocity of radio signal propagation (i.e. Lorentz reciprocity theorem or time-reversal symmetry) that, such a (e.g. expected) radio coverage of a certain radio positioning support device may describe (e.g. define) the area from which a radio positioning support signal transmitted by a mobile device is (e.g. expected to be) observable (e.g. receivable with a minimum quality) by the certain radio positioning support device. Based on the radio model of the coverage area of the radio positioning support system, it may thus be determined whether or not the above disclosed exemplary predetermined radio positioning support criterion (i.e. a radio positioning support signal transmitted by a mobile device is observed at least by a predetermined number of radio positioning support devices) is met at any monitoring position of the plurality of monitoring positions.

According to an exemplary embodiment of the invention, the method comprises:

determining, at least partially based on the plurality of reference observation reports, a radio model of the radio positioning support system.

The radio model of the radio positioning support system may be understood to be a radio model of the coverage area of the radio positioning support system. As disclosed above, an example of a radio model of the coverage area of the radio positioning support system may be a radio map representing a (e.g. expected) respective radio coverage model of each radio positioning support device of the plurality of radio positioning support devices. Optionally, such a radio map may also represent the installation positions of the plurality of radio positioning support devices. The radio coverage model of a certain radio positioning support device may describe (e.g. define) the area within which a radio reference signal transmitted by the certain radio positioning support devices is (e.g. expected to be) observable (e.g. receivable with a minimum quality).

Determining a radio model of the radio positioning support system may involve determining, for one or more (e.g. all) radio positioning support devices of the plurality of radio positioning support devices, a respective radio coverage model at least partially based on the plurality of reference observation reports. Additionally, this determining may be based on further information (e.g. one or more further observation reports that have been obtained before and/or a previously determined radio model of the radio positioning support system). For example, a previously determined radio model of the radio positioning support system may be updated by determining, for one or more (e.g. all) radio positioning support devices of the plurality of radio positioning support devices, a respective radio coverage model at least partially based on the observation reports.

A radio coverage model may represent an estimate of a two-dimensional or a three-dimensional radio coverage area. It may describe (e.g. define) the expected radio coverage (e.g. an expected coverage area) of a certain radio positioning support device within which a radio reference signal transmitted or by the certain radio positioning support device (e.g. installed at an installation position) is expected to be observable. The real radio coverage of the radio positioning support device may however deviate from such an expected radio coverage. As disclosed above, a radio signal (e.g. a radio reference signal or a radio positioning support signal) may be understood to be observable at a certain position if the radio signal is receivable with a minimum quality (e.g. a minimum signal-to-noise ratio and/or a minimum signal power and/or a minimum signal strength) at this certain position.

A radio coverage model may be a hard-boundary model or a soft-boundary model (e.g. a hard-boundary model or a soft-boundary model describing an expected radio coverage).

An example for a soft-boundary radio coverage model may be a parametric radio model. Data of such a parametric radio model may be considered to be data which enable determination of one or more characteristics of one or more radio signals (e.g. radio reference signals) transmitted by a radio positioning support device that are expected to be observable at different positions. For example, data of such a parametric radio model may represent radio propagation parameters of the parametric radio model. Using radio propagation parameters of the parametric radio model may have the effect that the required amount of data for defining the one or more characteristics of one or more radio signals may be particularly small. An example of a parametric radio model is a path loss model for radio signals (e.g. radio reference signals) transmitted by a radio positioning support device. In this case, the radio transmission parameters may comprise a path loss exponent and, optionally, an indication of a transmission power used by the transmitter of the radio positioning support device. Based on data of a parametric radio model an expected radio coverage of a radio positioning support device (e.g. installed at a fixed installation position) may be determined.

Radio transmission parameters of a parametric radio model of a radio positioning support device may be at least partially determined (e.g. derived or selected or calculated) at least partially based on the plurality of reference observation reports.

Alternatively or additionally, a soft boundary radio coverage model may be a radio image model representing an expected radio signal strength field of a radio reference signal transmitted or triggered to be transmitted by a certain radio positioning support device. An example of such a radio image model is a signal strength heatmap or a signal strength matrix.

An example for a hard-boundary radio coverage model may be a geometric model. Data of such a geometric radio model may be considered to be data which (e.g. geometrically) describe (e.g. define) an expected radio coverage of a radio positioning support device (e.g. installed at an installation position).

For example, each of the respective radio coverage models is one of:
a polygon;
a rectangle and/or a square;
a cuboid and/or a cube;
an ellipse and/or a circle; and
an ellipsoid and/or a sphere.

If the radio coverage model is one of these geometric shapes it may be referred to as a geometric model of an expected radio coverage of a radio positioning support device. Using such geometric models has the effect that the radio coverage model is very simple, only requires a small amount of data and is easy to analyze.

The installation position of a radio positioning support device may be within the geometric model, for example it may be at the center of the geometric model. The perimeter and/or the circumferences and/or the surface of the geometric model may for example describe (e.g. define) a boundary of an expected radio coverage (e.g. an area and/or a spatial dimension) of the radio positioning support device within which radio signals (e.g. radio reference signals) transmitted by the radio positioning support device are expected to be observable (e.g. receivable with a minimum quality). Outside of the perimeter and/or the circumferences and/or the surface, radio signals transmitted by the radio positioning support device are for example expected to be not observable (e.g. only receivable with a quality less than a minimum quality).

A parameter of a geometric model of a radio coverage of a radio positioning support device may be at least partially determined (e.g. selected or calculated) at least partially based on the plurality of observation reports. Examples of such parameters are a diameter, a radius and/or an edge length of the geometric model. For example, the parameter of the geometric model may be selected from a list of parameters according to a predetermined mapping. For example, an edge length of 16 m is selected for a square as geometric model of an (e.g. expected) radio coverage of a radio positioning support device having a physical radio transmission power level value of 0 dBm and a path loss exponent of 4.

According to an exemplary embodiment of the invention, the reconfiguration information for at least partially reconfiguring the radio positioning support system represent one or more potential installation positions (e.g. in the form of absolute or relative position coordinates or in the form of an installation map with highlighted potential installation positions) or one or more potential installation areas (e.g. in the form of an installation map with highlighted potential installation areas) for installing one or more further radio positioning support devices.

This embodiment may for example be advantageous, if it is determined (e.g. based on a radio model of the radio positioning support system) that at a specific position or in a specific area within the coverage area of the radio positioning support system less than a predetermined number of different radio reference signals is observable. The potential installation position and/or the potential installation area for installing an additional radio positioning support device may for example represent such a specific position and/or such a specific area.

According to an exemplary embodiment of the invention, each radio positioning support device of the plurality of radio positioning support devices is installed at a fixed installation position.

The installation position of a radio positioning support device may be understood to be the position at which the radio positioning support device is operated (e.g. transmits radio reference signals and/or scans for radio reference signals and/or radio positioning support signals). A radio positioning support device may be understood to be installed at a fixed installation position if (or as long as) the position at which the radio positioning support device is operated does not change and/or the radio positioning support device is mounted at this position (e.g. at a ceiling or wall of a building).

According to an exemplary embodiment of the invention, the disclosed method is performed by a radio positioning support device of the plurality of radio positioning support devices or a server (e.g. a positioning server) of the radio positioning support system.

According to an exemplary embodiment of the invention, the radio positioning support system may be a radio positioning support system for a predetermined environment (e.g. for a building or a complex of buildings like a shopping center, a parking garage, an airport, a company site, etc.). In particular, the radio positioning support system may be an indoor positioning system or a self-contained positioning system or a combination thereof, for example a self-contained indoor positioning system.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

The following description serves to deepen the understanding of the present invention and shall be understood to complement and be read together with the description of example embodiments of the invention as provided in the above SUMMARY section of this specification.

Figure 1A:
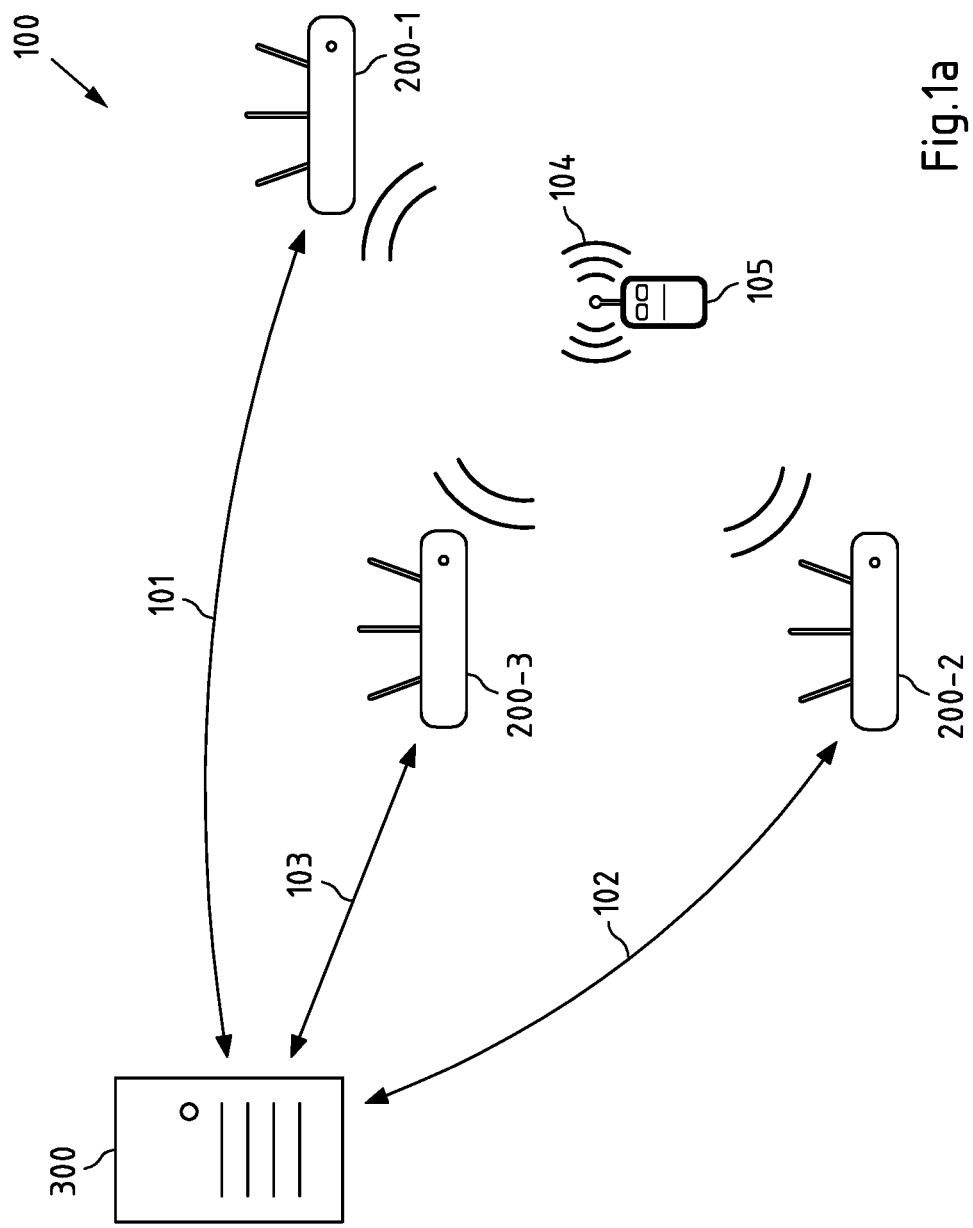
FIGS. 1a, b are block diagrams of an exemplary embodiment of a system according to an embodiment of the invention.
Figure 1B:
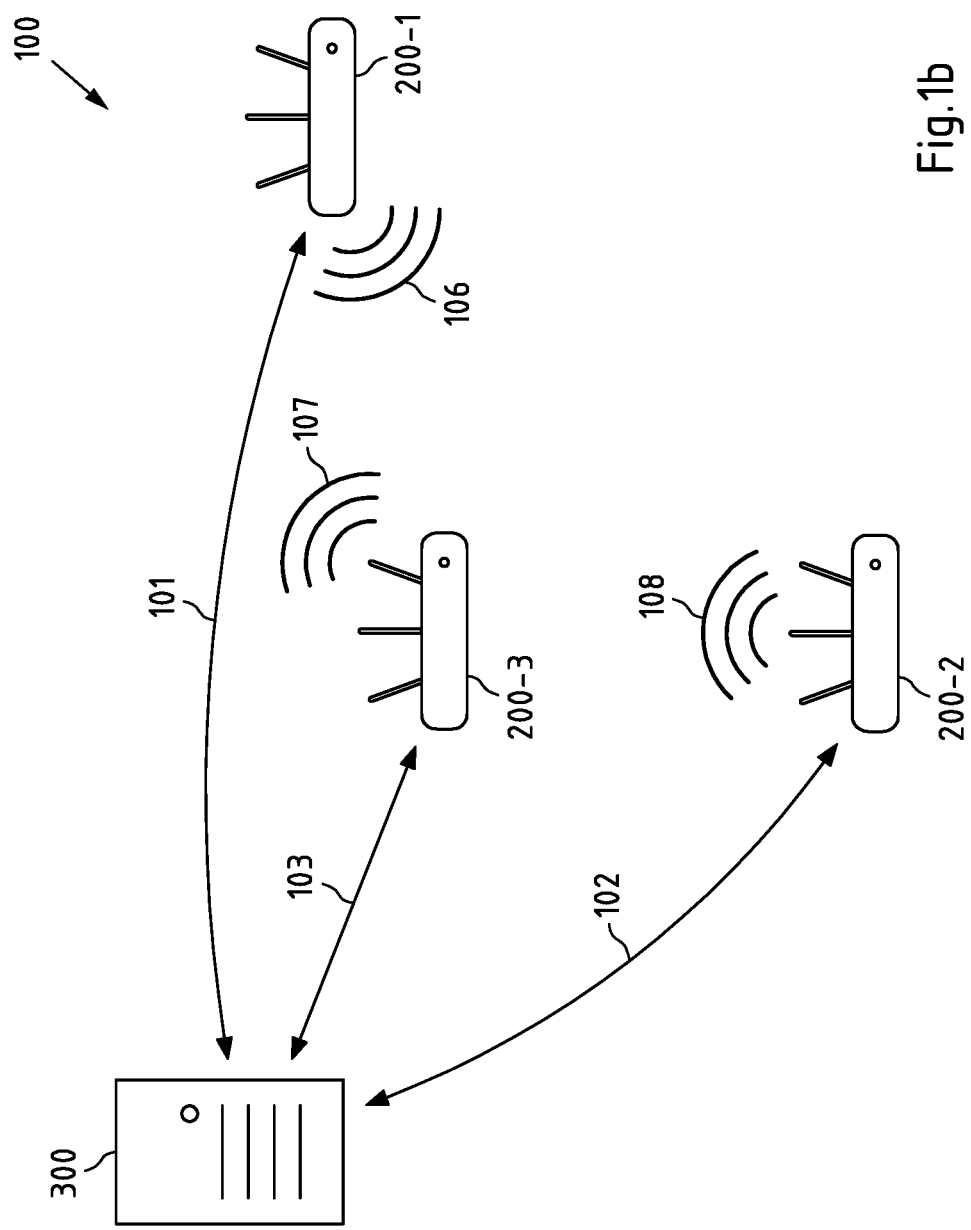

FIGS. 1a and 1b are block diagrams of an exemplary embodiment of a radio positioning support system 100 according to the invention.

System 100 at least partially illustrates a radio positioning support system of a positioning solution for a predetermined environment such as a building and/or a complex of buildings (e.g. a shopping center, a parking garage, an airport, a company site, etc.). System 100 comprises a plurality of radio positioning support devices 200-1, 200-2 and 200-3 and a server 300. Radio positioning support devices 200-1, 200-2 and 200-3 may correspond to radio positioning support device 200 as described below with respect to FIG. 2; and server 300 may correspond to server 300 as described below with respect to FIG. 3. Optionally, system 100 may comprise further radio positioning support devices and/or servers. For example, server 300 may be part of a server cloud and/or represented by a server cloud. In the following, reference is made to radio positioning support devices 200-1 to 200-3 and server 300 without limiting the scope of the invention.

Server 300 may be configured to communicate with radio positioning support devices 200-1 to 200-3 via communication paths 101, 102 and 103, respectively.

Communication paths 101 to 103 may be direct or indirect communication paths. For example, Communication paths 101 to 103 may comprise one or more hops, for example one or more wireless and/or wired network connections. In the following, it is assumed that communication paths 101 to 103 are wired network connections in a local area network (LAN). An example of a LAN is an Ethernet network as specified by the standards of the IEEE IEEE 802.3 family (http://www.ieee.org/).

Radio positioning support devices 200-1, 200-2 and 200-3 may be fixedly installed at respective installation positions in the predetermined environment. Each of radio positioning support devices 200-1 to 200-3 may be configured to scan for radio signals observable at the respective installation position and to generate a respective observation report representing scanning results obtained by scanning for radio signals (e.g. obtained by one scanning cycle). The scanning results may for example represent information extracted from observed radio signals and/or measurement results from measuring one or more parameters of observed radio positioning support signals. In the following, it is for example assumed that each of radio positioning support devices 200-1 to 200-3 may be configured to extract a radio signal identifier from an observed radio signal and to measure a received signal strength of an observed radio signal. Accordingly, an observation report generated by one of radio positioning support devices 200-1 to 200-3 may contain or represent, for each radio signal observed by this radio positioning support device when scanning for radio signals, a respective radio signal identifier and a respective received signal strength measurement result. As disclosed above, a radio reference signal identifier may be an identifier of the device that has transmitted the radio signal containing or representing the radio signal identifier. An example for an identifier of a device is a name of the device, an address of the radio positioning support device (e.g. a MAC address or an IP address), an universally unique identifier (UUID), a service set identifier (SSID), a basic service set identifier (BSSID), an Eddystone identifier (e.g. an Eddystone-UID having a namespace component and an instance identifier component) or a combination thereof. A received signal strength measurement result may be represented by a received signal strength indicator (RSSI) or a physical receiving power level value (e.g. a Rx power level value) in dBm.

A radio signal (e.g. a radio positioning support signal or a radio reference signal) may be understood to be observable by a certain radio positioning support device if it is received with a minimum quality (e.g. a minimum signal-to-noise ratio and/or a minimum signal power) by the certain radio positioning support device when scanning for radio signals (e.g. radio positioning support signals or radio reference signals).

In a positioning mode shown in FIG. 1a, each of radio positioning support devices 200-1 to 200-3 may scan for radio positioning support signals broadcasted by mobile devices and generate positioning observation reports representing scanning results obtained when scanning for radio positioning support signals (e.g. obtained during one scanning cycle). The scanning may be performed automatically and/or repeatedly (e.g. periodically and/or continuously and/or for a predetermined period of time). Accordingly, the positioning observation reports may be also generated automatically and/or repeatedly (e.g. after every scanning cycle) by radio positioning support devices 200-1 to 200-3.

In the following, it is assumed that such radio positioning support signals are broadcasted by mobile devices with a predetermined transmitting power and that they are Bluetooth and/or BLE radio signals (e.g. having an Eddystone signal format) containing or representing a respective Eddystone-UID of the respective transmitting mobile device as positioning support information. For example, radio positioning support signal 104 broadcasted by mobile device 105 may contain or represent a Eddystone-UID of mobile device 105. Accordingly, each of the radio positioning support devices 200-1 to 200-3 observing radio positioning support signal 104 when scanning for radio positioning support signals may generate a respective positioning observation report containing or representing the Eddystone-UID of mobile device 105 extracted from radio positioning support signal 104 and the respective received signal strength measured by the respective one of radio positioning support devices 200-1 to 200-3.

The positioning observation reports generated by radio positioning support devices 200-1 to 200-3 may be communicated to server 300 via communication paths 101, 102 and 103, respectively.

Server 300 may be configured to determine an estimated position of a mobile device like mobile device 105 based on such positioning observation reports. For example, the estimated position may be determined by trilateration. It is for example possible to determine an estimated distance between the mobile device and a certain radio positioning support device based on the predetermined transmitting power, a received signal strength measured by the certain radio positioning support device and a path-loss exponent. As disclosed above, the transmitting power for broadcasting radio positioning support signals may be predetermined. Similarly, the path loss exponent may be predetermined for radio positioning support system 100 (e.g. selected based on radio characteristics of the predetermined environment). If each of radio positioning support devices 200-1 to 200-3 observes radio positioning support signal 104 broadcasted by mobile device 105, server 300 may determine estimated distances between mobile device 105 and radio positioning support devices 200-1 to 200-3 and, thus, may determine and an estimated position of mobile device 105 by trilateration. It is however to be understood that the present invention is not limited to trilateration. For example, an estimated position of a mobile device may be determined by triangulation as well.

In a reconfiguration mode shown in FIG. 1b, each of radio positioning support devices 200-1 to 200-3 may broadcast a respective radio reference signal (i.e. radio reference signals 106 to 108, respectively), scan for radio reference signals broadcasted by other radio positioning support devices and generate reference observation reports representing scanning results obtained when scanning for radio reference signals (e.g. obtained during one scanning cycle). The broadcasting and scanning may be performed automatically and/or repeatedly (e.g. periodically and/or continuously and/or for a predetermined period of time). Accordingly, the reference observation reports may be also generated automatically and/or repeatedly (e.g. after every scanning cycle) by radio positioning support devices 200-1 to 200-3.

As disclosed above, each radio reference signal of the radio reference signals 106 to 108 may emulate a radio positioning support signal. A radio reference signal may be understood to emulate a radio positioning support signal if both are transmitted with identical radio signal parameters. In the following, it is thus assumed that the radio reference signals 106 to 108 are transmitted with the same predetermined transmitting power like radio positioning support signal 105 and that they are Bluetooth and/or BLE radio signals (e.g. having an Eddystone signal format) containing or representing a respective Eddystone-UID of the respective radio positioning support device. Accordingly, each of radio positioning support devices 200-1 to 200-3 observing one or more of radio reference signals 106 to 108 when scanning for radio positioning support signals may generate a respective reference observation report containing or representing, for each observed radio reference signal, a respective Eddystone-UID extracted from the respective radio reference signal and the respective received signal strength of the respective radio reference signal measured by the respective one of radio positioning support devices 200-1 to 200-3. For example, if radio positioning support device 200-1 observes radio reference signals 107 and 108 broadcasted by radio positioning support devices 200-2 and 200-3 when scanning for radio reference signals, it may generate a reference observation report containing or representing Eddystone-Ms of radio positioning support devices 200-2 and 200-3 and a respective received signal strength measurement result for both radio reference signals 107 and 108.

The reference observation reports generated by radio positioning support devices 200-1 to 200-3 may be communicated to server 300 via communication paths 101, 102 and 103, respectively.

Figure 2:
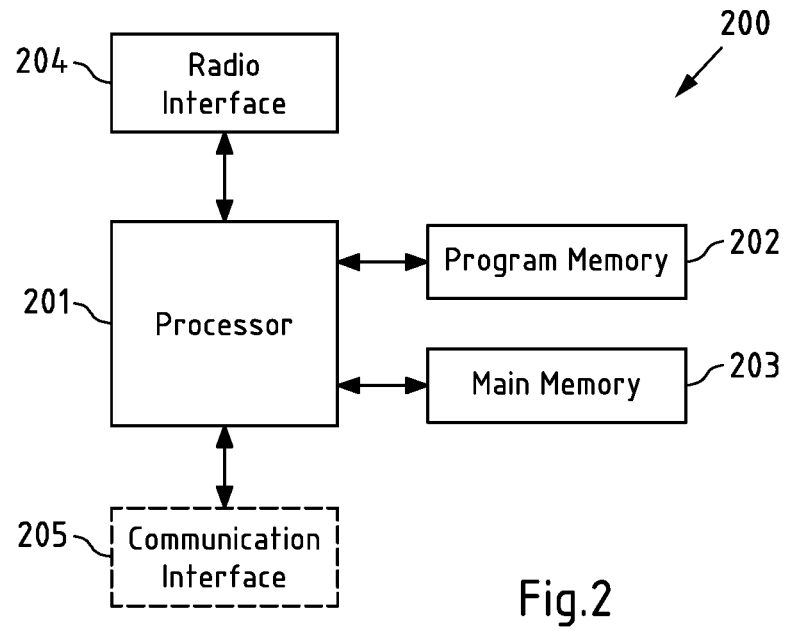
FIG. 2 is a block diagram of an exemplary embodiment of a radio positioning support device according to an embodiment of the invention.

FIG. 2 is a block diagram of an exemplary embodiment of an apparatus according to the invention. In the following, it is assumed that the apparatus is a radio positioning support device 200 for a radio positioning support system like system 100.

Radio positioning support device 200 comprises a processor 201. Processor 201 may represent a single processor or two or more processors, which are for instance at least partially coupled, for instance via a bus. Processor 201 executes a program code stored in program memory 202 (for instance program code causing server 200 to perform one or more of the embodiments of a method (or parts thereof) according to the invention, when executed on processor 201), and interfaces with a main memory 203.

Some or all of a program memory like program memory 202 and main memory 203 may be included in the respective processor like processor 201. For example, they may be fixedly connected to the processor or at least partially removable from the processor, for example in the form of a memory card or stick. A program memory like program memory 202 may for example be a non-volatile memory. It may for instance be a FLASH memory (or a part thereof), any of a ROM, PROM, EPROM, MRAM or a FeRAM (or a part thereof) or a hard disc (or a part thereof), to name but a few examples. A program memory may also comprise an operating system for the processor. It may for instance comprise a first memory portion that is fixedly connected to the processor, and a second memory portion that is removable from the processor, for example in the form of a removable SD memory card.

A main memory like main memory 203 may for example be a volatile memory. It may for instance be a DRAM memory, to give non-limiting example. It may for instance be used as a working memory for the respective processor when executing an operating system and/or programs.

Processor 201 further controls a radio interface 204 configured to receive and/or transmit radio signals. For example, radio interface 204 may be configured to receive radio signals from mobile devices (e.g. radio positioning support signal 104) and/or from other radio positioning support devices (e.g. radio reference signals 106 to 108). Moreover, radio interface 204 may be configured to transmit radio signals (e.g. a radio reference signal like one of radio reference signals 106 to 108).

The radio interface 204 may at least comprise a BLE radio interface, for example including a BLE transceiver. The BLE radio transceiver may be configured to scan for radio signals that are broadcast by mobile devices (e.g. radio positioning support signal 104) and/or other radio positioning support devices (e.g. radio reference signals 106 to 108) as disclosed above with respect to FIGS. 1a and 1b, to extract a respective identifier from each observed radio signal and to measure a respective received signal strength of each observed radio signal. Moreover, the BLE radio transceiver may be configured to broadcast a radio reference signal (e.g. one of radio reference signals 106 to 108) as disclosed above with respect to FIGS. 1a and 1b.

It is to be understood that any computer program code based processing required for receiving and processing radio signals may be stored in an own memory of radio interface 204 and executed by an own processor of the radio interface 204 or it may be stored for example in memory 203 and executed for example by processor 201.

Moreover, processor 201 may control a further optional communication interface 205 which is for example configured to allow communication over a network connection in a LAN (e.g. over communication paths 101 to 103). For example, communication interface 205 is an Ethernet communication interface 205.

The components 202 to 205 of radio positioning support device 200 may for instance be connected with processor 201 by means of one or more serial and/or parallel busses.

It is to be understood that radio positioning support device 200 may comprise various other components. For example, radio positioning support device 200 may optionally comprise a user interface (e.g. a touch-sensitive display, a keyboard, a touchpad, a display, etc.).

Figure 3:
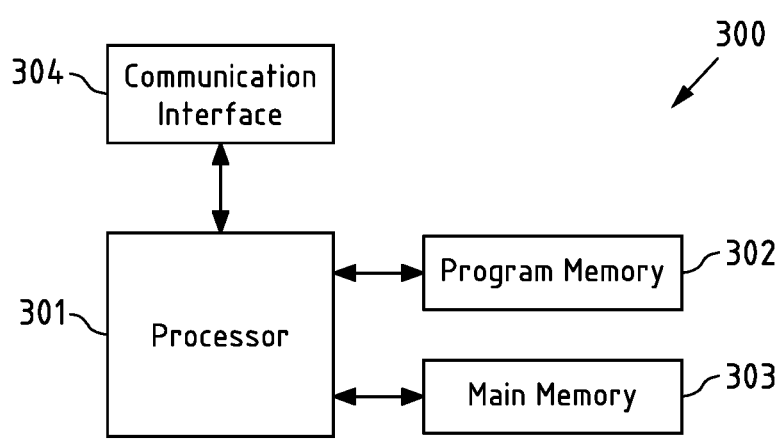
FIG. 3 is a block diagram of another exemplary embodiment of a server according to an embodiment of the invention.

FIG. 3 is a block diagram of an exemplary embodiment of another apparatus according to the invention. In the following, it is assumed that the apparatus is a server 300 for a radio positioning support system like system 100.

Server 300 comprises a processor 301. Processor 301 may represent a single processor or two or more processors, which are for instance at least partially coupled, for instance via a bus. Processor 301 executes a program code stored in program memory 302 (for instance program code causing server 300 to perform one or more of the embodiments of a method (or parts thereof) according to the invention (as for instance further described below with reference to FIG. 4), when executed on processor 301), and interfaces with a main memory 303.

Processor 301 further controls a communication interface 304 which is for example configured to allow communication over a network connection in a LAN (e.g. over communication paths 101 to 103). For example, communication interface 304 is an Ethernet communication interface 304.

The components 302 to 304 of server 300 may for instance be connected with processor 301 by means of one or more serial and/or parallel busses.

It is to be understood that server 300 may comprise various other components. For example, server 300 may optionally comprise a user interface (e.g. a touch-sensitive display, a keyboard, a touchpad, a display, etc.).

Figure 4:
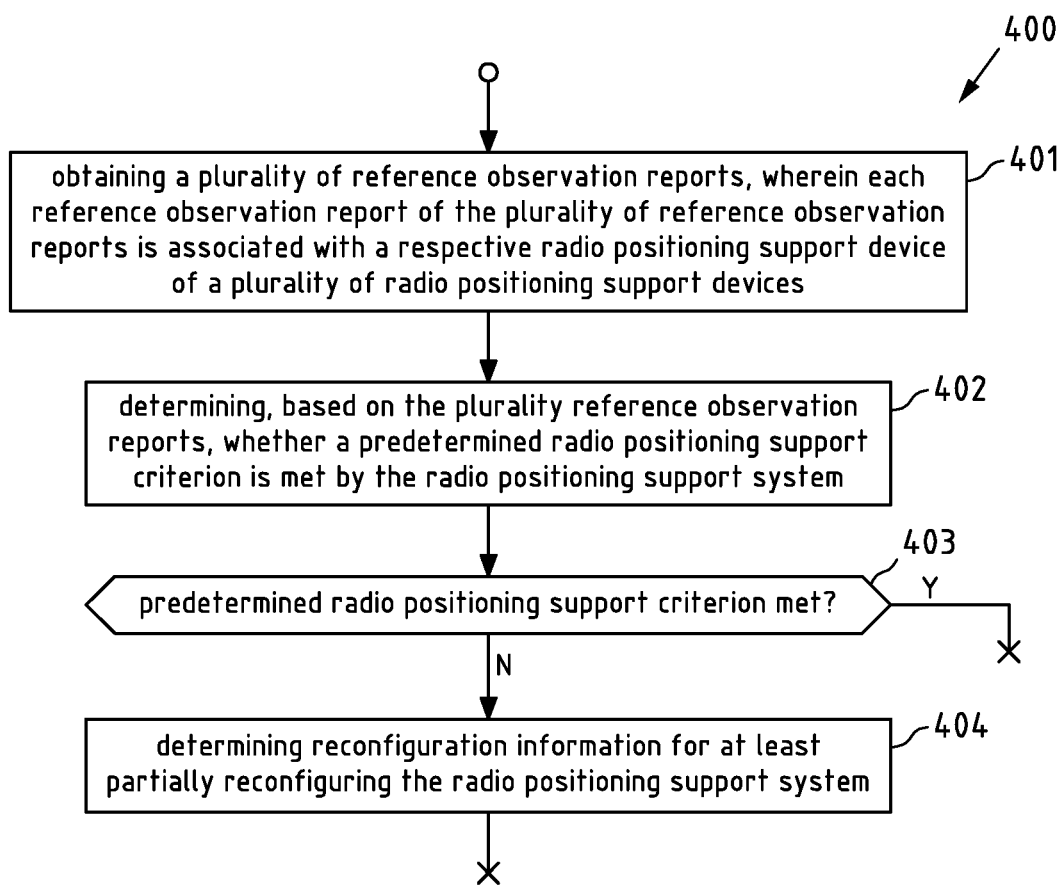
FIG. 4 is a flow chart illustrating an exemplary embodiment of a method according to an embodiment of the invention.

FIG. 4 is a flow chart 400 illustrating an exemplary embodiment of a method according to the invention. Without limiting the scope of the invention, it is assumed in the following that server 300 of system 100 as described above with respect to FIGS. 1 and 3 performs steps 401 to 403 of flow chart 400.

In a step 401, a plurality of reference observation reports are obtained by server 300, wherein each reference observation report of the plurality of reference observation reports is associated with a respective radio positioning support device of the plurality of radio positioning support devices 200-1 to 200-3.

The plurality of observation reports may be obtained in step 401 by receiving the plurality of reference observation reports via communication paths 101 to 103 from radio positioning support devices 200-1 to 200-3.

As disclosed above, each of the radio positioning support devices 200-1 to 200-3 observing one or more of radio reference signals 106 to 108 when scanning for radio positioning support signals may generate a respective reference observation report containing or representing, for each observed radio reference signal, a respective Eddystone-UID extracted from the respective radio reference signal and the respective received signal strength of the respective radio reference signal measured by the respective one of radio positioning support devices 200-1 to 200-3. Therein, a respective reference observation report generated by a respective one of radio positioning support devices 200-1 to 200-3 may be understood to be associated with the respective one of radio positioning support devices 200-1 to 200-3.

In step 402, server 100 determines, based on the plurality of reference observation reports obtained in step 401, whether a predetermined radio positioning support criterion is met by radio positioning support system 100.

That the determining is at least partially based on the obtained plurality of observation reports may be understood to mean that one or more reference observation reports of the plurality of reference observation reports are considered for the determining in step 402. For example, for each radio positioning support device of the plurality of radio positioning support devices, the determining may be only based on the latest respective observation report and/or any respective observation report(s) that were obtained within a predetermined period of time (e.g. the last hour, the last six hours, the last 12 hours or the last 24 hours).

As disclosed above, the predetermined radio positioning support criterion may be selected such that the radio positioning support system 100 enables determining an estimated position of a mobile device like mobile device 105 based on a radio positioning support signal like radio positioning support signal 104 transmitted by the mobile device with a predetermined minimum accuracy within a coverage area of the radio positioning support system 100 if the predetermined radio positioning support criterion is met.

For example, the predetermined radio positioning support criterion may require that a radio positioning support signal transmitted by a mobile device at any position within the coverage area of radio positioning support system 100 is received by a minimum number of radio positioning support devices. Based on the reciprocity of radio signal propagation (i.e. Lorentz reciprocity theorem or time-reversal symmetry), the reference observation reports representing scanning results obtained by scanning for radio reference signals emulating radio positioning support signals allow conclusions to be drawn regarding such a predetermined radio positioning support criterion.

According to a first exemplary solution, the determining in step 402 may include determining whether by any radio positioning support devices of radio positioning support devices 200-1 to 200-3 at least a predetermined number of different radio reference signals is (e.g. expected to be) observable and/or whether by one or more radio positioning support devices of radio positioning support devices 200-1 to 200-3 less than the predetermined number of different radio reference signals is (e.g. expected to be) observable. The predetermined number of different radio reference signals may correspond to the minimum number of radio positioning support devices according to the predetermined radio positioning support criterion decremented by one.

It may be expected based on the reciprocity of radio signal propagation (i.e. Lorentz reciprocity theorem or time-reversal symmetry) that, if any radio positioning support devices of radio positioning support devices 200-1 to 200-3 observes at least the predetermined number of different radio reference signals emulating a respective radio positioning support signal, a radio positioning support signal transmitted by a mobile device located at one of the installation positions of radio positioning support devices 200-1 to 200-3 is observed at least by the minimum number of radio positioning support devices. As disclosed above, the predetermined number of different radio reference signals is one less than the minimum number of radio positioning support devices, because it is expected that the radio positioning support device installed at the respective installation position observes the radio positioning support signal as well.

Based on the scanning results represented by the plurality of observation reports generated by radio positioning support devices 200-1 to 200-3, it may thus be determined whether or not the above disclosed predetermined radio positioning support criterion (i.e. a radio positioning support signal transmitted by a mobile device is observed at least by the minimum number of radio positioning support devices) is (e.g. expected to be) met at the installation positions of radio positioning support devices 200-1 to 200-3. For example, if the reference observation report associated with radio positioning support device 200-1 contains or represents Eddystone-UIDs of radio positioning support devices 200-2 and 200-3, it may be determined in step 402 that at least two different radio reference signals are (e.g. expected to be) observable by radio positioning support device 200-1 and, thus, that a radio positioning support signal transmitted by a mobile device located at the installation position of radio positioning support device 200-1 is (e.g. expected to be) observed by at least three radio positioning support devices (i.e. radio positioning support devices 200-2 and 200-3 as well as radio positioning support device 200-1).

Moreover if the radio positioning support devices 200-1 to 200-3 are uniformly installed across the coverage area of system 100, it may be expected that, if the radio positioning support criterion is met at the installation positions of radio positioning support devices 200-1 to 200-3, it is met throughout the coverage area of system 100. Accordingly, it may be determined in step 402 according to this first exemplary solution that the radio positioning support criterion is met if it is determined that by any of radio positioning support devices 200-1 to 200-3 at least the predetermined number of different radio reference signals is (e.g. expected to be) observable. Alternatively or additionally, it may be determined that the radio positioning support criterion is not met if it is determined that by one or more of radio positioning support devices 200-1 to 200-3 less than the predetermined number of different radio reference signals is (e.g. expected to be) observable.

According to a second exemplary solution, the determining in step 402 may include determining whether at any monitoring position of a plurality of monitoring positions within the coverage area of radio positioning support system 100 at least the predetermined number of different radio reference signals is (e.g. expected to be) observable and/or whether at one or more monitoring positions of the plurality of monitoring positions within the coverage area of the radio positioning support system less than the predetermined number of different radio reference signals is (expected to be) observable.

The plurality of monitoring positions may be selected such that it is expected that the radio positioning support criterion is met at any position within the coverage area of the radio positioning support system if it is met at any monitoring position of the plurality of monitoring positions. Accordingly, it may be determined in step 402 according to the second exemplary solution that the radio positioning support criterion is met if it is determined that at any monitoring position of the plurality of monitoring positions at least the predetermined number of different radio reference signals is (e.g. expected to be) observable; and/or it may be determined that the radio positioning support criterion is not met if it is determined that at one or more monitoring positions of the plurality of monitoring positions less than the predetermined number of different radio reference signals is (e.g. expected to be) observable.

The monitoring positions of the plurality of monitoring positions may at least partially correspond to grid points of a grid overlaying the coverage area of radio positioning support system 100. The grid may be a regular grid. For example, the grid may be a square grid having a predetermined edge length, for example the predetermined edge length may be 1 m, 2 m, 5 m or 10 m to name a few non limiting examples.

For example, the plurality of monitoring positions may be at least partially different from the installation positions of radio positioning support devices 200-1 to 200-3. For example, the plurality of monitoring positions may comprise additional monitoring positions in addition to the installation positions of radio positioning support devices 200-1 to 200-3.

Accordingly, it may be necessary to interpolate the scanning results represented by the reference observation reports obtained in step 401 to the additional monitoring positions. To this end, a respective radio model for the coverage area of the radio positioning support system 100 may be determined in step 402 at least partially based on the plurality of observation reports. A radio model of the coverage area of the radio positioning support system may be understood to be a representation of the (e.g. expected) propagation characteristics of radio signals (e.g. radio reference signals transmitted by radio positioning support devices like radio reference signals 101 to 103 or radio positioning support signals transmitted by mobile devices like radio positioning support signal 104) within the coverage area of system 100.

An example of a radio model of the coverage area of the radio positioning support system 100 may be a radio map representing a radio coverage model of each of radio positioning support devices 200-1 to 200-3. The radio coverage model of a certain radio positioning support device may describe (e.g. define) the area within which a radio reference signal transmitted by the certain radio positioning support devices is (e.g. expected to be) observable (e.g. receivable with a minimum quality). It may be expected based on the reciprocity of radio signal propagation (i.e. Lorentz reciprocity theorem or time-reversal symmetry) that, such a (e.g. expected) radio coverage of a certain radio positioning support device may describe (e.g. define) the area from which a radio positioning support signal transmitted by a mobile device is (e.g. expected to be) observable (e.g. receivable with a minimum quality) by the certain radio positioning support device. Based on the radio model of the coverage area of the radio positioning support system, it may thus be determined whether or not the above disclosed exemplary predetermined radio positioning support criterion (i.e. a radio positioning support signal transmitted by a mobile device is observed at least by the predetermined number of radio positioning support devices) is met at any monitoring position of the plurality of monitoring positions.

As disclosed above, a radio coverage model of a radio positioning support device may be a hard-boundary model or a soft-boundary model. An example for a soft-boundary radio coverage model may be a parametric radio model. An example for a hard-boundary radio coverage model may be a geometric model.

An example for a soft-boundary radio coverage model may be a parametric radio model. Data of such a parametric radio model may be considered to be data which enable determination of one or more characteristics of one or more radio signals (e.g. radio reference signals) transmitted by a radio positioning support device that are expected to be observable at different positions. For example, data of such a parametric radio model may represent radio propagation parameters of the parametric radio model. Using radio propagation parameters of the parametric radio model may have the effect that the required amount of data for defining the one or more characteristics of one or more radio signals may be particularly small. An example of a parametric radio model is a path loss model for radio signals (e.g. radio reference signals) transmitted by a radio positioning support device. In this case, the radio transmission parameters may comprise a path loss exponent and, optionally, an indication of a transmission power used by the transmitter of the radio positioning support device. Based on data of a parametric radio model an expected radio coverage of a radio positioning support device (e.g. installed at a fixed installation position) may be determined.

It is for example possible to determine a path-loss exponent for such a path loss model based on the predetermined transmitting power, a received signal strength measurement result of a radio reference signal transmitted by the radio positioning support device and a distance to the radio positioning support device which has measured the received signal strength. The transmitting power is predetermined and thus known. Similarly, the installation positions of radio positioning support devices 200-1 to 200-3 and, thus, the distances between them are known. Moreover, received signal strength measurement results are represented by or contained in the reference observation reports. Accordingly, the path loss exponents may be at least partially determined (e.g. derived or selected or calculated) at least partially based on the plurality of reference observation reports.

An example for a hard-boundary radio coverage model may be a geometric model. Data of such a geometric radio model may be considered to be data which (e.g. geometrically) describe (e.g. define) an expected radio coverage of a radio positioning support device (e.g. installed at an installation position).

For example, each of the respective radio coverage models is one of:

a polygon;
a rectangle and/or a square;
a cuboid and/or a cube;
an ellipse and/or a circle; and
an ellipsoid and/or a sphere.

If the radio coverage model is one of these geometric shapes it may be referred to as a geometric model of an expected radio coverage of a radio positioning support device. Using such geometric models has the effect that the radio coverage model is very simple, only requires a small amount of data and is easy to analyze.

The installation position of a radio positioning support device may be within the geometric model, for example it may be at the center of the geometric model. The perimeter and/or the circumferences and/or the surface of the geometric model may for example describe (e.g. define) a boundary of an expected radio coverage (e.g. an area and/or a spatial dimension) of the radio positioning support device within which radio signals (e.g. radio reference signals) transmitted by the radio positioning support device are expected to be observable (e.g. receivable with a minimum quality). Outside of the perimeter and/or the circumferences and/or the surface, radio signals transmitted by the radio positioning support device are for example expected to be not observable (e.g. only receivable with a quality less than a minimum quality).

A parameter of a geometric model of a radio coverage of a radio positioning support device may be at least partially determined (e.g. selected or calculated) at least partially based on the plurality of observation reports. Examples of such parameters are a diameter, a radius and/or an edge length of the geometric model. For example, the parameter of the geometric model may be selected from a list of parameters according to a predetermined mapping. For example, an edge length of 16 m is selected for a square as geometric model of an (e.g. expected) radio coverage of a radio positioning support device having a physical radio transmission power level value of 0 dBm and a path loss exponent of 4.

It is to be understood that a previously determined coverage area model of system 300 which is represented by information or data stored in program memory 302 of server 300 may be updated in step 402 with the radio coverage models that are determined at least partially based on the observation reports obtained in step 401. The accordingly determined (updated) radio model of system 100 may then be used to determine whether at any monitoring position of the plurality of monitoring positions within the coverage area of radio positioning support system 100 at least the predetermined number of different radio reference signals is (e.g. expected to be) observable and/or whether at one or more monitoring positions of the plurality of monitoring positions within the coverage area of radio positioning support system 100 less than the predetermined number of different radio reference signals is (e.g. expected to be) observable.

In a step 403, if it is determined in step 402 that the predetermined radio positioning support criterion is met by system 300, flowchart 400 may be terminated.

If it is however determined in step 402 that the predetermined radio positioning support criterion is not met by system 300, reconfiguration information for at least partially reconfiguring radio positioning support system 100 are determined by server 300 in a step 404. For example, the reconfiguration information for at least partially reconfiguring radio positioning support system 100 may represent one or more potential installation positions (e.g. in the form of absolute or relative position coordinates or in the form of an installation map with highlighted potential installation positions) or one or more potential installation areas (e.g. in the form of an installation map with highlighted potential installation areas) for installing one or more further radio positioning support devices.

The method of flowchart 400 may be an iterative method which may need one or more iterations before the predetermined radio positioning support criterion is met by system 100.

Figure 5:
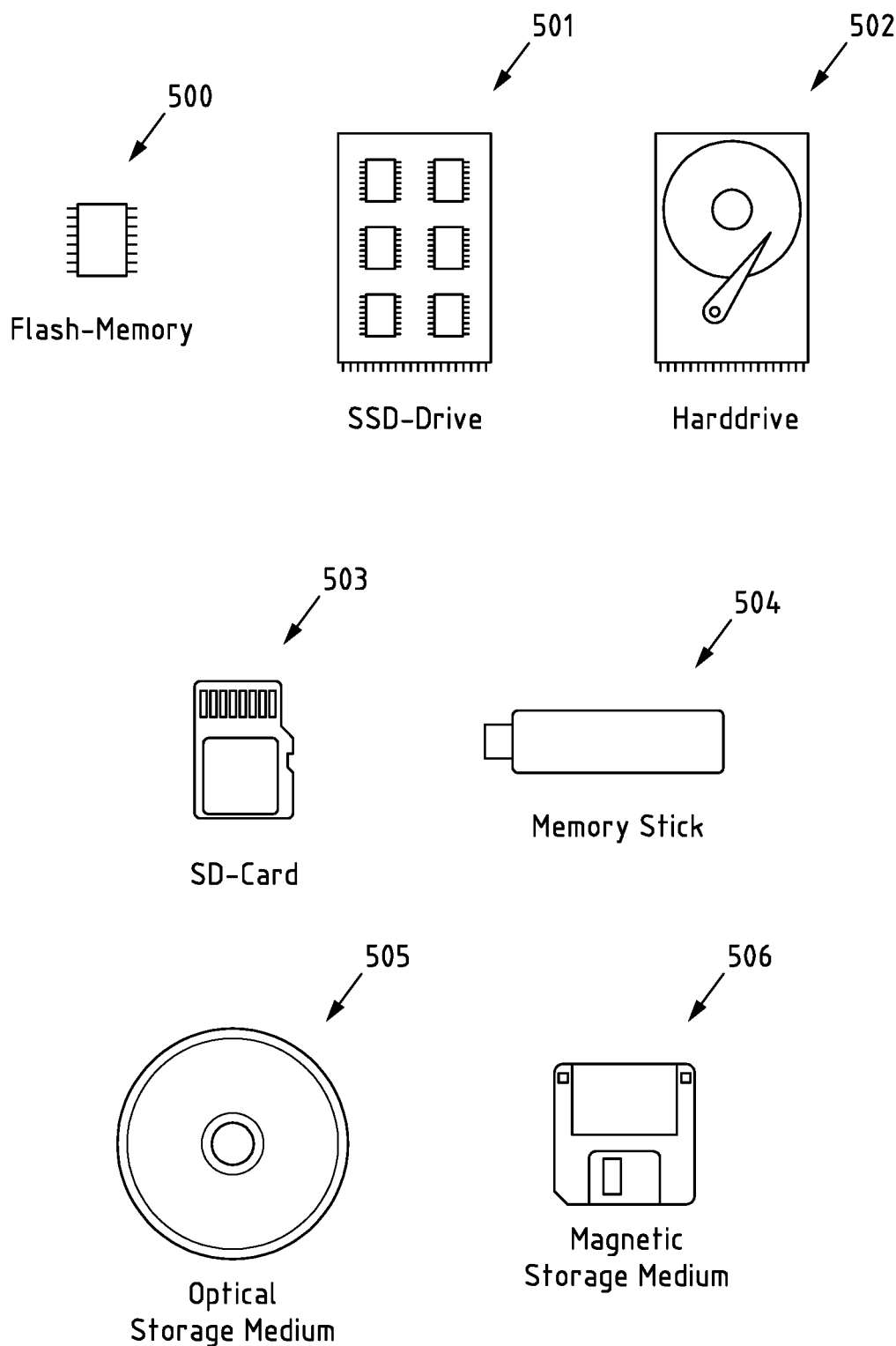
FIG. 5 is a schematic illustration of examples of tangible and non-transitory storage media according to an embodiment of the invention.

FIG. 5 is a schematic illustration of examples of tangible and non-transitory computer-readable storage media according to the present invention that may for instance be used to implement program memory 202 or 302 of FIGS. 2 and 3 respectively. To this end, FIG. 5 displays a flash memory 500, which may for instance be soldered or bonded to a printed circuit board, a solid-state drive 501 comprising a plurality of memory chips (e.g. Flash memory chips), a magnetic hard drive 502, a Secure Digital (SD) card 503, a Universal Serial Bus (USB) memory stick 504, an optical storage medium 505 (such as for example a CD-ROM or DVD) and a magnetic storage medium 506.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 201 and 301 of FIGS. 2 and 3, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (i) A, or (ii) B, or (iii) C, or (iv) A and B, or (v) A and C, or (vi) B and C, or (vii) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

That which is claimed is:

1. A method for at least partially reconfiguring a radio positioning support system, wherein said radio positioning support system is configured for determining a position of a mobile device at least partially based on a radio positioning support signal transmitted by said mobile device and received by one or more radio positioning support devices fixedly installed at respective installation positions, said method comprising:
    obtaining a plurality of reference observation reports, wherein each reference observation report of said plurality of reference observation reports is associated with a respective radio positioning support device of a plurality of radio positioning support devices including the one or more radio positioning support devices, and wherein each reference observation report of said plurality of reference observation reports represents scanning results from scanning, by said respective radio positioning support device that is fixedly installed at a respective installation position and with which said respective reference observation report is associated, for radio reference signals transmitted by other radio positioning support devices of said plurality of radio positioning support devices;
    determining, based on said plurality of reference observation reports, whether a predetermined radio positioning support criterion is met by said radio positioning support system; and
    if it is determined that said predetermined radio positioning support criterion is not met by said radio positioning support system, determining reconfiguration information for at least partially reconfiguring said radio positioning support system, wherein said reconfiguration information represents one or more potential installation positions or one or more potential installation areas for installing one or more further radio positioning support devices.

2. The method according to claim 1, wherein each radio reference signal of said radio reference signals emulates a radio positioning support signal.

3. The method according to claim 1, wherein one or more radio positioning support devices of said plurality of radio positioning support devices are configured for at least one of transmitting a respective radio reference signal and scanning for radio reference signals transmitted by other radio positioning support devices of said plurality of radio positioning support devices.

4. The method according to claim 1, wherein each reference observation report of said plurality of reference observation reports contains or represents at least one of:
    a respective radio reference signal identifier for each radio reference signal observed by said respective radio positioning support device with which said respective reference observation report is associated when scanning for observable radio reference signals;
    one or more respective radio measurements results for each radio reference signal observed by said respective radio positioning support device with which said respective reference observation report is associated when scanning for observable radio reference signals;
    an indication for a number of radio reference signal observed by said respective radio positioning support device with which said respective reference observation report is associated when scanning for observable radio reference signals;
    an identifier of said respective radio positioning support device with which said observation report is associated;
    an indication of said installation position of said radio positioning support device with which said observation report is associated.

5. The method according to claim 1, said method comprising at least one of:
    determining, at least partially based on said plurality of reference observation reports, whether by any radio positioning support devices of said plurality of radio positioning support devices at least a predetermined number of different radio reference signals is observable;
    determining, at least partially based on said reference observation reports, whether by one or more radio positioning support devices of said plurality of radio positioning support devices less than said predetermined number of different radio reference signals is observable;
    determining, at least partially based on said reference observation reports, whether at any monitoring position of a plurality of monitoring positions within a coverage area of said radio positioning support system at least said predetermined number of different radio reference signals is observable; and
    determining, at least partially based on said reference observation reports, whether at one or more monitoring positions of said plurality of monitoring positions within said coverage area of said radio positioning support system less than said predetermined number of different radio reference signals is observable.

6. The method according to claim 5, wherein said predetermined number of different radio reference signals is set to three, four, five or ten.

7. The method according to claim 5, wherein said plurality of monitoring positions corresponds to grid points of a grid overlaying said coverage area of said radio positioning support system.

8. The method according to claim 5, wherein said predetermined radio positioning support criterion is met if one of the following holds:
   it is determined that by any radio positioning support devices of said plurality of radio positioning support devices at least a predetermined number of different radio reference signals is observable, or
   it is determined that at any monitoring position of said plurality of monitoring positions within said coverage area of said radio positioning support system at least said predetermined number of different radio reference signals is observable.

9. The method according to claim 5, wherein said predetermined radio positioning support criterion is not met if one of the following holds:
   it is determined that by one or more radio positioning support devices of said plurality of radio positioning support devices less than said predetermined number of different radio reference signals is observable, or
   it is determined that at one or more monitoring positions of said plurality of monitoring positions within said coverage area of said radio positioning support system less than said predetermined number of different radio reference signals is observable.

10. The method according to claim 1, said method comprises:
   determining, at least partially based on said plurality of reference observation reports, a radio model of said radio positioning support system.

11. The method according to claim 1, wherein said reconfiguration information for at least partially reconfiguring said radio positioning support system represent one or more potential installation positions or one or more potential installation areas for installing one or more further radio positioning support devices.

12. A non-transitory computer readable storage medium in which computer program code is stored, said computer program code when executed by a processor causing at least one apparatus to perform a method for at least partially reconfiguring a radio positioning support system, wherein said radio positioning support system is configured for determining a position of a mobile device at least partially based on a radio positioning support signal transmitted by said mobile device and received by one or more radio positioning support devices fixedly installed at respective installation positions, said method comprising:
   obtaining a plurality of reference observation reports, wherein each reference observation report of said plurality of reference observation reports is associated with a respective radio positioning support device of a plurality of radio positioning support devices including the one or more radio positioning support devices, and wherein each reference observation report of said plurality of reference observation reports represents scanning results from scanning, by said respective radio positioning support device that is fixedly installed at a respective installation position and with which said respective reference observation report is associated, for radio reference signals transmitted by other radio positioning support devices of said plurality of radio positioning support devices;
   determining, based on said plurality of reference observation reports, whether a predetermined radio positioning support criterion is met by said radio positioning support system; and
   if it is determined that said predetermined radio positioning support criterion is not met by said radio positioning support system, determining reconfiguration information for at least partially reconfiguring said radio positioning support system, wherein said reconfiguration information represents one or more potential installation positions or one or more potential installation areas for installing one or more further radio positioning support devices.

13. An apparatus for at least partially reconfiguring a radio positioning support system, wherein said radio positioning support system is configured for determining a position of a mobile device at least partially based on a radio positioning support signal transmitted by said mobile device and received by one or more radio positioning support devices fixedly installed at respective installation positions, wherein said apparatus comprises at least one processor and at least one memory including computer program code, said at least one memory and said computer program code configured to, with said at least one processor, cause said apparatus at least to perform:
   obtaining a plurality of reference observation reports, wherein each reference observation report of said plurality of reference observation reports is associated with a respective radio positioning support device of a plurality of radio positioning support devices including the one or more radio positioning support devices, and wherein each reference observation report of said plurality of reference observation reports represents scanning results from scanning, by said respective radio positioning support device that is fixedly installed at a respective installation position and with which said respective reference observation report is associated, for radio reference signals transmitted by other radio positioning support devices of said plurality of radio positioning support devices;
   determining, based on said plurality of reference observation reports, whether a predetermined radio positioning support criterion is met by said radio positioning support system; and
   if it is determined that said predetermined radio positioning support criterion is not met by said radio positioning support system, determining reconfiguration information for at least partially reconfiguring said radio positioning support system, wherein said reconfiguration information represents one or more potential installation positions or one or more potential installation areas for installing one or more further radio positioning support devices.

14. The apparatus according to claim 13, wherein each radio reference signal of said radio reference signals emulates a radio positioning support signal.

15. The apparatus according to claim 13, wherein one or more radio positioning support devices of said plurality of radio positioning support devices are configured for at least one of transmitting a respective radio reference signal and scanning for radio reference signals transmitted by other radio positioning support devices of said plurality of radio positioning support devices.

16. The apparatus according to claim 13, wherein each reference observation report of said plurality of reference observation reports contains or represents at least one of:
- a respective radio reference signal identifier for each radio reference signal observed by said respective radio positioning support device with which said respective reference observation report is associated when scanning for observable radio reference signals;
- one or more respective radio measurements results for each radio reference signal observed by said respective radio positioning support device with which said respective reference observation report is associated when scanning for observable radio reference signals;
- an indication for a number of radio reference signal observed by said respective radio positioning support device with which said respective reference observation report is associated when scanning for observable radio reference signals;
- an identifier of said respective radio positioning support device with which said observation report is associated;
- an indication of said installation position of said radio positioning support device with which said observation report is associated.

17. The apparatus according to claim 13, wherein said at least one memory and said computer program code are further configured to, with said at least one processor, cause said apparatus to perform at least one of:
- determining, at least partially based on said plurality of reference observation reports, whether by any radio positioning support devices of said plurality of radio positioning support devices at least a predetermined number of different radio reference signals is observable;
- determining, at least partially based on said reference observation reports, whether by one or more radio positioning support devices of said plurality of radio positioning support devices less than said predetermined number of different radio reference signals is observable;
- determining, at least partially based on said reference observation reports, whether at any monitoring position of a plurality of monitoring positions within a coverage area of said radio positioning support system at least said predetermined number of different radio reference signals is observable; and
- determining, at least partially based on said reference observation reports, whether at one or more monitoring positions of said plurality of monitoring positions within said coverage area of said radio positioning support system less than said predetermined number of different radio reference signals is observable.

18. The apparatus according to claim 17, wherein said predetermined number of different radio reference signals is set to three, four, five or ten.

19. The apparatus according to claim 17, wherein said plurality of monitoring positions corresponds to grid points of a grid overlaying said coverage area of said radio positioning support system.

* * * * *